United States Patent
Dale, Jr. et al.

(10) Patent No.: US 6,634,109 B1
(45) Date of Patent: Oct. 21, 2003

(54) METHOD AND SYSTEM FOR DETERMINING SYMMETRY AND ACKERMANN GEOMETRY STATUS OF THE STEERING SYSTEM OF A VEHICLE

(75) Inventors: James L. Dale, Jr., Conway, AR (US); David A. Jackson, Point Roberts, WA (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/991,882

(22) Filed: Nov. 26, 2001

(51) Int. Cl.[7] .................................................. G01B 5/24
(52) U.S. Cl. ...................... 33/203; 33/288; 33/203.12; 33/203.18
(58) Field of Search .......................... 33/203, 203.12, 33/203.13, 203.14, 203.18, 203.19, 288

(56) References Cited

U.S. PATENT DOCUMENTS

| | | | |
|---|---|---|---|
| 2,667,805 A | * 2/1954 | Carr | 33/288 |
| 3,181,248 A | * 5/1965 | Manlove | 33/203 |
| 4,109,747 A | 8/1978 | Hornagold et al. | 180/140 |
| 4,600,205 A | 7/1986 | Stewart et al. | 280/95 |
| 5,208,646 A | * 5/1993 | Rogers et al. | 33/288 |
| 5,519,489 A | 5/1996 | McClenahan et al. | 356/139.09 |
| 5,832,617 A | * 11/1998 | Gill | 33/203 |
| 5,930,881 A | * 8/1999 | Naruse et al. | 29/407.08 |
| 6,272,409 B1 | * 8/2001 | Elwood | 180/435 |
| 6,283,483 B1 | * 9/2001 | Johnson et al. | 280/5.522 |

* cited by examiner

Primary Examiner—Diego Gutierrez
Assistant Examiner—Amy R Cohen
(74) Attorney, Agent, or Firm—McDermott, Will & Emery (57) ABSTRACT

The present disclosure provides a method and system for determining symmetry and Ackermann geometry status of the steering system of a vehicle. A system according to the disclosure determines symmetry of the steering system based on toe angle differences of the steerable wheels. Thus, no specification is required for determining symmetry of the steering system. A system according to the disclosure determines symmetry of the steering system based on normalized toe angles. Consequently, the steerable wheel does not have to be positioned at a specific angle. Additionally, the present disclosure determines symmetry in the steering system of a vehicle without requiring turning steering wheels through a large angular range. Hence, technician efforts in steering the wheel are reduced. The disclosure also provides an improved alignment procedure that implements determination of symmetry of the steering system into the alignment procedure. The present disclosure provides a novel machine-implemented procedure to determine Ackermann geometry status of a steering system based on theoretical Ackermann angles.

41 Claims, 9 Drawing Sheets

FIG. 1

(PRIOR ART)

METHOD AND SYSTEM FOR DETERMINING SYMMETRY AND ACKERMANN GEOMETRY STATUS OF THE STEERING SYSTEM OF A VEHICLE

FIELD OF THE DISCLOSURE

The present disclosure relates to a method and system for characterizing the steering system of a vehicle and determining symmetry and Ackermann geometry status thereof, and more particularly, to a fault tolerant method and system for determining symmetry and Ackermann geometry of the steering system of a vehicle.

BACKGROUND OF THE DISCLOSURE

The magnitude of total toe during turns affects both tire wear and vehicle handling. An asymmetrical steering system with different amounts of total toe when steering left or right may indicate faulty components in the vehicle, which can degrade the vehicle handling and cause problems, such as the darting to one side as the vehicle goes over an undulation. Therefore, it is important to know whether the steering system of a vehicle is symmetrical.

For determining proper steering geometry and symmetry of steering systems, automobile manufacturers provide a specification for Toe Out On Turns (TOOT). TOOT is generally measured by requiring technicians to turn the inner wheel in a first direction, say, left, at 20 degrees and measures the toe angle of the outer wheel. The measurement is then compared with a specification value. The same procedure and measurement are repeated for the other direction (in this example, right). As an alternative, total toe is measured and compared with the specification. Asymmetry in the steering system, as indicated by dissimilar TOOT values, is a fairly reliable indicator of damaged or improper steering components, or even chassis damage, including improper repairs after an accident.

Symmetry checks using TOOT measurements have drawbacks. First, TOOT is not always checked during an alignment process. Second, TOOT specification requires taking measurement at 20 degrees, technicians have to precisely position the wheels at the specific angle before toe angle measurements can be taken. Positioning a wheel at a specific angle requires high maneuver precision.

Furthermore, while TOOT measurements are taken at 20 degrees of turn, measurements for various alignment parameters, such as caster and steering axis inclination (SAI, are taken at ten degrees of toe. As a consequence, technicians have to turn the steerable wheels from the straight ahead position through precisely ten degrees to determine caster and steering axis inclination, and then turn another ten degrees to determine TOOT.

Besides, TOOT specifications require taking measurement at 20 degrees of turn. Many aligners do not have the angular range to measure twenty degrees of turn by purely electro-optical means. Although other equipment, such as electronic turnplates, can be used in place of the aligner's measurement instrument, additional installation is needed, which adds expenses.

Another important characteristic of the steering system of a vehicle is Ackermann geometry. One hundred percent Ackermann geometry is created by using a trapezoidal shaped steering linkage. Ackermann geometry causes all of the vehicle wheels to describe arcs about a common point. Thus, theoretically, eliminating any wheel scrub at low speeds and minimizing tire wear from cornering. Even though most vehicles are designed to have less than one hundred percent Ackermann geometry, significant deviation from one hundred percent Ackermann geometry may be an indication of damaged, non-compliant, or mis-adjusted parts in a vehicle's steering system, which can cause problems similar to an asymmetric steering system.

Figure 1:
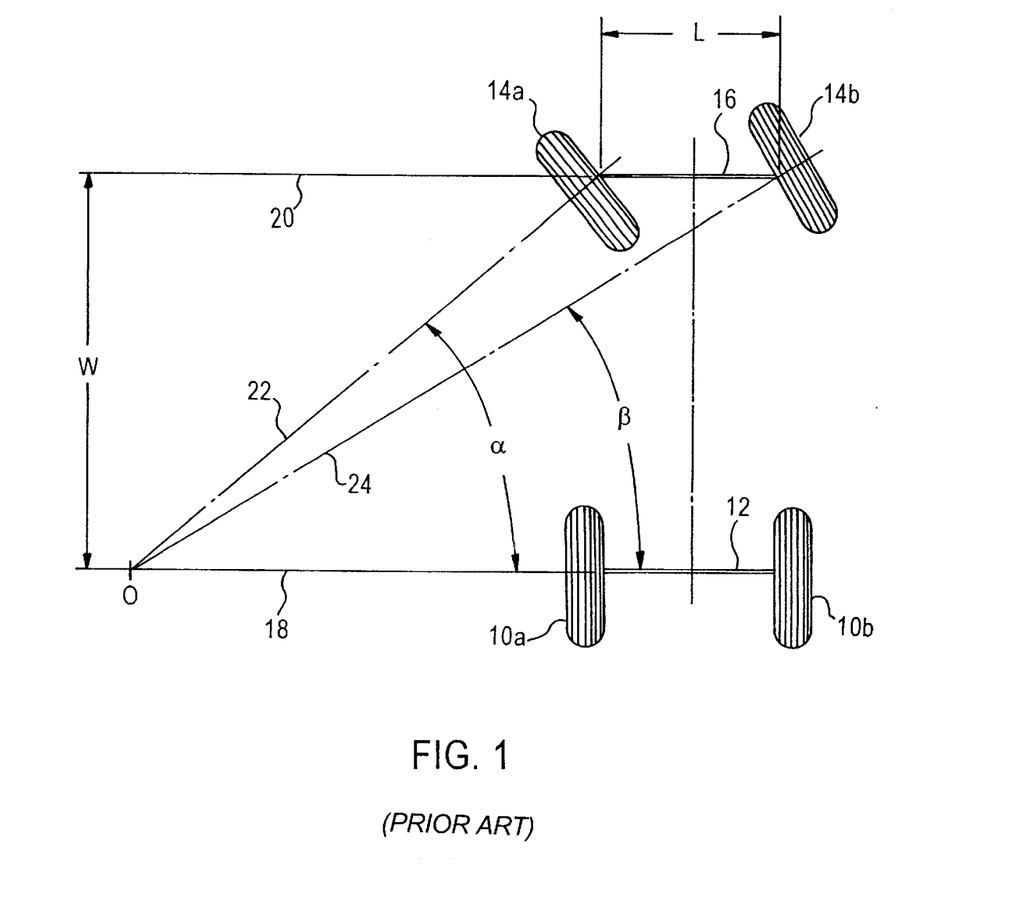
FIG. 1 shows a vehicle having true Ackermann geometry.

FIG. 1 shows a vehicle having true Ackermann geometry. A pair of fixed-direction wheels 10a and 10b are mounted for rotation upon a rear axle 12, and a pair or steerable wheels 14a and 14b are rotatably mounted upon a front axle 16, both pair of wheels being conventionally positioned about the longitudinal axis of the vehicle chassis.

As the wheels are turned, the outer wheel must turn at a lesser angle than the inner wheel to prevent scuffing of the wheels as the vehicle makes a turn. The center lines of the rear and front axles are represented by the axle lines 18 and 20, respectively. The lines 22 and 24 represent the axes of the respective steerable wheels 14a and 14b. A steering system having perfect Ackermann geometry will have an optimum rolling action relative to point O. For purpose of reference, the steerable wheel that is closer to point O during turning is referred to as the inner wheel, while the steerable wheel that is farther than the other steerable wheel relative to point O is referred to as the outer wheel.

Practical limitations of design and requirements for optimizing handling at higher speeds require steering systems designed at other than perfect Ackermann geometry. It has been known that, due to the design of steering systems, perfect Ackermann geometry can be achieved only at one specific turning angle for each turning direction (i.e., left and right). However, significant deviation from Ackermann geometry may indicate defects in the steering system.

Even though pure Ackermann geometry is not practical and generally not desired, the relationship of steering characteristics to theoretically pure Ackermann is an extremely useful tool for the developers of steering systems. Applications for a steering analysis system include vehicle development engineers, racing car development and tuning, collision repair analysis, and heavy truck fleets.

Automobile manufacturers, however, do not publish Ackermann specifications. Without an Ackermann geometry specification, garages have no way to detect and correct errors related to Ackermann geometry.

Therefore, there is a need for effective determination of symmetry of a vehicle's steering system. There is another need to determine symmetry of a vehicle's steering system at any toe angle. Still another need exists for determining Ackermann geometry without an Ackermann geometry specification. These and other needs are addressed by the present disclosure.

SUMMARY OF THE DISCLOSURE

The disclosure provides a method and system for determining symmetry and Ackermann geometry of a steering system of a vehicle. An advantage of methods and systems according to the disclosure is that, during determining symmetry measurement of a steering system, the steerable wheels can be positioned at any toe angle. Methods and systems according to disclosure are also advantageous in that it allows determination of Ackermann geometry based on a TOOT specification, even without an Ackermann specification. A further advantage of systems and methods according to the disclosure arises from providing an improved alignment procedure that incorporates determination of symmetry of the steering system into other alignment procedures. The present disclosure provides a novel procedure to determine Ackermann geometry of a steering system based on theoretical Ackermann angles. Additionally, a system and method according to the disclosure determines symmetry in a steering system of a vehicle without the need to turn steering wheels through a huge angular range.

A method according to the present disclosure determines symmetry of the steering system of a vehicle of a type having first and second steerable wheels normal to a common axis when the wheels are aligned to a longitudinal axis of the vehicle. The method detects a first measured toe angle of the first steerable wheel when the second steerable wheel is positioned in a first direction at a reference toe angle, such as 10 degrees, and a second measured toe angle of the second steerable wheel when the first steerable wheel is positioned in a second direction at the reference toe angle. The second direction is opposite to the first direction relative to the longitudinal axis of the vehicle. The method determines symmetry of the steering system based on the first measured toe angle and the second measured toe angle.

In one aspect, the method compares determines symmetry of steering system based on the first measured toe angle, the second measured toe angle, and a threshold value. An angle difference between the first measured toe angle and the second measure toe angle is calculated and compared with the threshold value. If the angle difference is larger than the threshold value, the steering system is determined as asymmnetrical.

In one aspect, the first steerable wheel is the right front wheel and the second steerable wheel is the left front wheel. In another aspect, the determination can be made in an inverse way in which the first steerable wheel is the left front wheel and the second steerable wheel is the right front wheel.

A system according to the disclosure determines symmetry of the steering system of a vehicle of a type having first and second steerable wheels normal to a common axis when the wheels are aligned to a longitudinal axis of the vehicle. The system is configured to connect to a measurement device for generating toe angle signals representative of toe angles of the steerable wheels. The system comprises a processor for processing data, a memory, a data storage device for storing data, an input device for inputting data, and a bus coupling to the input device, the memory, the data storage device, and the processor.

The system receives a first signal representative of a first measured toe angle of the first steerable wheel when the second steerable wheel is positioned in a first direction at a reference toe angle, and receives a second signal representative of a second measured toe angle of the second steerable angle when the first steerable wheel is positioned in a second direction at the reference toe angle. The reference toe angle may be any angle preset by the system or set by an operator. The second direction is opposite to the first direction relative to the longitudinal axis of the vehicle. The system determines symmetry of the steering system based on the first measured toe angle and the second measured toe angle. Additionally, the system may determine symmetry of the steering system based on the first measured toe angle, the second measured toe angle, and a threshold value. The threshold value may be determined based on the value of the reference toe angle.

In one aspect, the system determines an angle difference between the first and second measured toe angles. The angle difference is compared with the threshold value. If the angle difference is greater than the threshold value, the steering system is determined as asymmetrical.

Since the reference toe angle can by any angle obtained from any source, such as preset by the system, input by an operator, or obtained from a database, the method and system do not need a TOOT specification to determine symmetry of the steering system.

In another aspect of the disclosure, the determination of symmetry of the steering system is combined into alignment procedures. For example, the detection of the measured angles may be conducted during a caster swing procedure or a Toe Out On Turns procedure. In addition, the reference toe angle may be a predetermined angle, such as 10 degrees, as required in alignment procedures when measuring caster or steering axis inclination. The reference toe angle can be 20 degrees as required by TOOT specification. Thus, symmetry of the steering system can also be determined based on data collected during the existing alignment process without the need of any additional procedures.

Another system according to the present disclosure determines symmetry without the need to position the steering wheel at a specific angle. Rather, the system generates normalized measured angles based on the difference -between the wheel toe angles and a predetermined angle, and determines symmetry of the steering system based on the normalized toe angles.

Another system according to the present disclosure provides a novel approach to determine Ackermann geometry status of a steering system based on a theoretical Ackermann angle. The system is configured to receive a first signal representative of a first toe angle of the first steerable wheel and a second signal representative of a second toe angle of the second steerable wheel when the first steerable wheel is positioned at the first toe angle. A theoretical Ackermann angle is calculated based on a wheelbase value representing the length of the vehicle's wheelbase, a track width value representing the vehicle's track width, and the first toe angle. The system determines Ackermann geometry status of the steering system based on the second toe angle and the theoretical Ackermann angle.

The system determines symmetry of the steering system based on the normalized first toe angle and the normalized second toe angle. Alternatively, the system determines symmetry of the steering system based on the normalized first toe angle, the normalized second toe, and a threshold value. For example, an angle difference is calculated between the normalized angles and the angle difference is compared with a threshold value, such as three degrees. If the angle difference is larger than three degrees, the steering system is determined as asymmetrical; otherwise, the steering system is determined as symmetrical.

Thus, technicians can position the wheels at any angle, and, if preferred, near a predetermined angle, such as 20 degrees as required by the TOOT specification. The system calculates the normalized toe angles and determines symmetry accordingly.

Another system according to the present invention provides a novel approach to determine Ackermann geometry status of a steering system based on a theoretical Ackermann angle. The system is configured to receive a first signal representative of a first toe angle of the first steerable wheel and a second signal representative of a second toe angle of the second steerable wheel when the first steerable wheel is positioned at the first toe angle. A theoretical Ackermann angle is calculated based on a wheelbase value representing the length of the vehicle's wheelbase, a track width value representing the vehicle's track width, and the first toe angle. The system determines Ackermann geometry status of the steering system based on the second toe angle and the theoretical Ackermann angle.

In one aspect, the system may determine Ackermann geometry status of the steering system based on an Ackermann percentage. The system determines an Ackermann percentage based on the second toe angle and the theoretical Ackermann angle. The Ackermann percentage is then compared with a threshold value. The system determines Ackermann geometry status of the steering system based on a result of the comparison.

In another aspect, the system may have a database that includes values of wheelbase and track width of different vehicle models. Thus, the theoretical Ackermann angle can be calculated by accessing the database without measuring the wheelbase and track width. The values can also be obtained from other sources, such as measured by the system by attaching proper sensors or measurement devices, or the values can be input by an operator by checking a printed reference book, or by measuring manually, such as with a tape measure.

In one aspect of the present disclosure, a troubleshooting process is displayed in response to the steering system being determined as lacking proper Ackermann geometry.

While certain descriptions in the above illustrate the disclosure based on a generic description of first and second steerable wheels, in one aspect of the disclosure, the first steerable wheel may be the right steerable wheel and, the second steerable wheel may be the left steerable wheel. Inversely, the first steerable wheel is the left steerable wheel and the second steerable wheel is the right steerable wheel of the vehicle.

Still other advantages of the present disclosure will become readily apparent from the following detailed description, simply by way of illustration of the disclosure and not limitation. As will be realized, the disclosure is capable of other and different embodiments, and its several details are capable of modifications in various obvious respects, all without departing from the disclosure. Accordingly, the drawing and description are to be regarded as illustrative in nature, and not as restrictive.

BRIEF DESCRIPTION OF THE DRAWINGS

The accompanying drawings, which are incorporated in and constitute a part of the specification, illustrate embodiments of the present disclosure and, together with the description, serve to exemplify the principles of the present disclosure.

DETAILED DESCRIPTION OF PREFERRED EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Figure 2A:
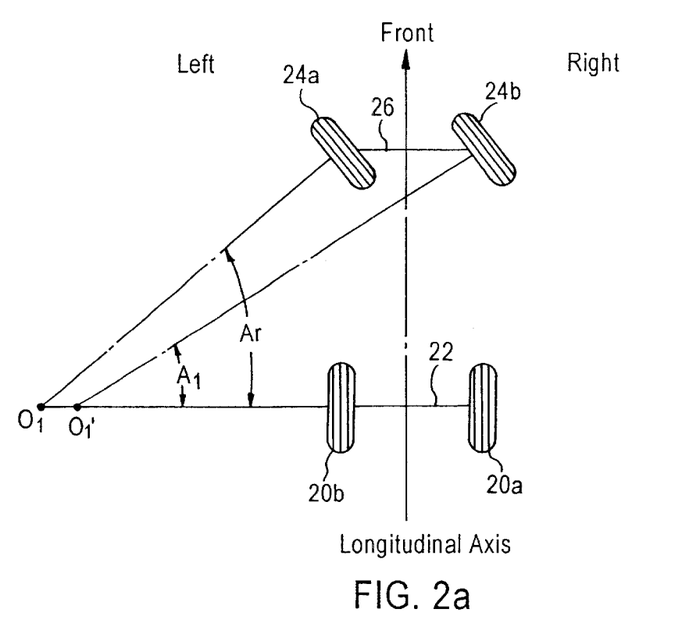
FIGS. 2a and 2b illustrate a vehicle under test according an embodiment of the present disclosure.
Figure 2B:
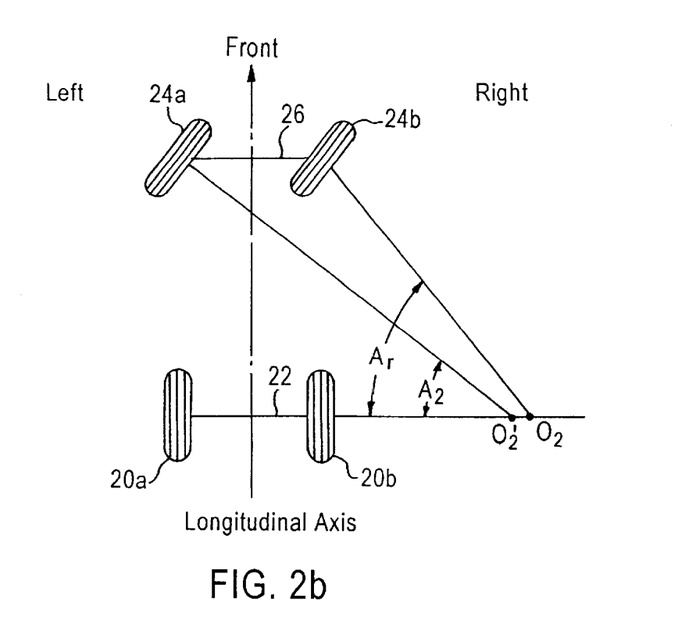

According to one embodiment of the present invention, a system for determining symmetry of a vehicle's steering system includes a measurement device for measuring toe angles of a steerable wheel of a vehicle, and a data processing system, such as a computer, configured to connect to the measurement device for receiving toe signals representing toe angles of the steerable wheel. The system determines symmetry of the vehicle based on the received toe signals, data stored in the system, and/or other inputs. FIGS. 2a and 2b show a vehicle under test according an embodiment of the present dissclosure.

In FIGS. 2a and 2b, a pair of fixed-direction wheels 20a and 20b are mounted for rotation upon a rear axle 22, and a pair or steerable wheels 24a and 24b are rotatably mounted upon a front axle 26, both pair of wheels being conventionally positioned about the longitudinal axis of the vehicle chassis. The measurement device is installed at suitable positions to detect the toe angles of the steerable wheels and send the toe signals to the data processing system for further analysis.

In FIG. 2a, the steerable wheels are turned to a first direction relative to the longitudinal axis of the vehicle chassis. Wheel 24a is the left steerable wheel and wheel 24b is the right steerable wheel. As wheel 24a is positioned at a reference toe angle Ar, wheel 24b has a first measured toe angle A1. The steerable wheels are then turned to a second direction opposite to the first direction relative to the longitudinal axis of the vehicle, as illustrated in FIG. 2b. In FIG. 2b, wheel 24b is positioned to the reference toe angle Ar and wheel 24a has a second measured toe angle A2.

For a vehicle having a symmetrical steering system, since the inner wheels are positioned at the same toe angle in both directions, the first and second measured toe angles, A1 and A2, should be substantially the same. The data processing system calculates an angle difference between the first measured toe angle A1 and the second measured toe angle A2. Symmetry of the steering system is determined based on the angle difference and a threshold value.

The threshold value can be an angle value or a percentage value that is preset by the system or input by an operator operating the system. The threshold value may be determined based on the value of the reference toe angle. For example, the threshold value can be set as an angle value, such as one degree, for a reference angle set at 20 degrees. After the system obtains the angle difference between the first measured toe angle A1 and the second measured toe angle A2, the system compares the angle difference with the threshold value, which is one degree. In response to the angle difference exceeding the threshold value, the data processing system determines the steering system as asymmetrical; otherwise, the steering system is symmetrical.

As another example, the threshold value can be set as a percentage value, such as 5%. After the system obtains the angle difference between the first measured toe angle A1 and the second measured toe angle A2, the system calculates an angle difference percentage based on the reference angle and the angle difference:

angle difference percentage=[(angle difference)/(reference angle)] *100%

If the angle difference percentage is greater than the threshold value, which is 5% in this example, the system determines the steering system as asymmetrical.

Thus, according to the above, any angle can be used as the reference toe angle to determine symmetry of the steering system without requiring the steerable wheel be positioned at exactly 20 degrees, as required by the TOOT specification.

Although the above example describes positioning the inner wheels (wheels closer to turning points O1, O1' and O2, O2' when making turns relative to O1, O1' and O2, O2') at the reference toe angle and measuring toe angles for outer wheels (wheels farther from turning points O1, O1' and O2, O2' when making turns relative to O1, O1' and O2, O2'), alternatively, the determination can also be carried out by positioning outer wheels at the reference toe angle and measuring toe angles of the inner wheels. In addition, the steerable wheels can be turned to the second direction first and then to the first direction for purpose of obtaining the toe angle data.

Another aspect of the disclosure combines determination of symmetry with alignment procedures. Vehicle alignment is often carried out by aligners that are capable of determining certain vehicle parameters, such as camber, caster, SAI, etc. Examples of aligners are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference.

Manufacturers of automotive vehicles provide specifications for various alignment parameters, such as camber, caster, and steering axis inclination. Traditionally, caster and SAI are measured at ten-degree inner toe angles. During alignment procedures, toe angles of the steerable wheels are measured when the steerable wheels being turned to first and second directions at a ten-degree angle, similar to the procedure described in FIGS. 2a and 2b.

Thus, during alignment procedures, steerable wheel 24a is turned to a first direction and positioned at a ten-degree inner toe angle. The steerable wheels are then turned to a second direction and wheel 24b is positioned at a ten-degree toe angle. The second direction is opposite to the first direction relative to the longitudinal axis of the vehicle. Since the alignment procedures are similar to that discussed in FIGS. 2a and 2b, the measured toe angles can be used to determine symmetry of the steering system.

For instance, a system according the disclosure may combine the determination of symmetry into the caster swing procedure. During caster swing, the steerable wheels are turned to a first direction at 10 degrees and then to a second direction at 10 degrees. During the caster swing, the measurement device tracks the toe angles of the steerable wheels and sends signals representative of the toe angles to the data processing system. The data processing system then determines symmetry of the steering system based on the measured toe angles, as described above. While the above example uses 10 degrees toe angle as an illustration, other toe angle values can also be used.

By combining the determination of symmetry into the alignment procedure, technicians do not have to turn the steerable wheels from the straight ahead position through precisely ten degrees to determine caster and steering axis inclination and then turn another ten degrees to determine TOOT, as required by TOOT specification. Therefore, operation efficiency is increased.

Although the above procedure is discussed based on positioning the inner wheels at a specific toe angle and measure the toe angles of outer wheels, it is understood that the procedure can be conducted by positioning outer wheels at a specific toe angle and measure the toe angles of inner wheels.

Another aspect of the present disclosure provides fault tolerant operation during determination of symmetry. In the past, using TOOT to determine symmetry requires technicians to position the inner wheels at exactly 20 degrees so that the outer toe angle can be compared with the TOOT specification. According to this embodiment, the steerable wheels can be positioned at any toe angle, or, if preferred, be positioned at a toe angle near a predetermined toe angle, such as 20 degrees required by the TOOT specification.

In receiving toe signals representing toe angles of the wheels, the data processing system will generate a normalized toe angle based on the detected toe angle and a predetermined toe angle. For example, if the predetermined inner toe angle is 6.00 degrees and the detected inner toe angle is 6.05 degrees and the detected outer toe angle is 5.88 degrees, the outer toe angle is normalized based on the difference between the inner toe angle and the predetermined inner toe angle. Therefore, in this example, the normalized outer toe angle will be 5.88+5.88*(6.05−6.0)/6.0=5.83 degree. Of course, other normalization methods well known to the people skilled in the art, such as a non-linear normalization based on a specification, can also be used.

The data processing system then determines symmetry of the steering system using the procedures as described above based on the normalized toe angles. Accordingly, unlike the TOOT procedures, symmetry of the steering system can be determined even when the steerable wheels are not positioned at a specific angle. Thus, an easier operation is achieved.

One aspect of the disclosure provides a novel approach for determining Ackermann geometry without having an Ackermann specification system of the disclosure implements a novel procedure to determine Ackermann geometry status based on a theoretical Ackermann angle. In accord with an embodiment, a theoretical Ackermann angle is calculated.

Figure 3:
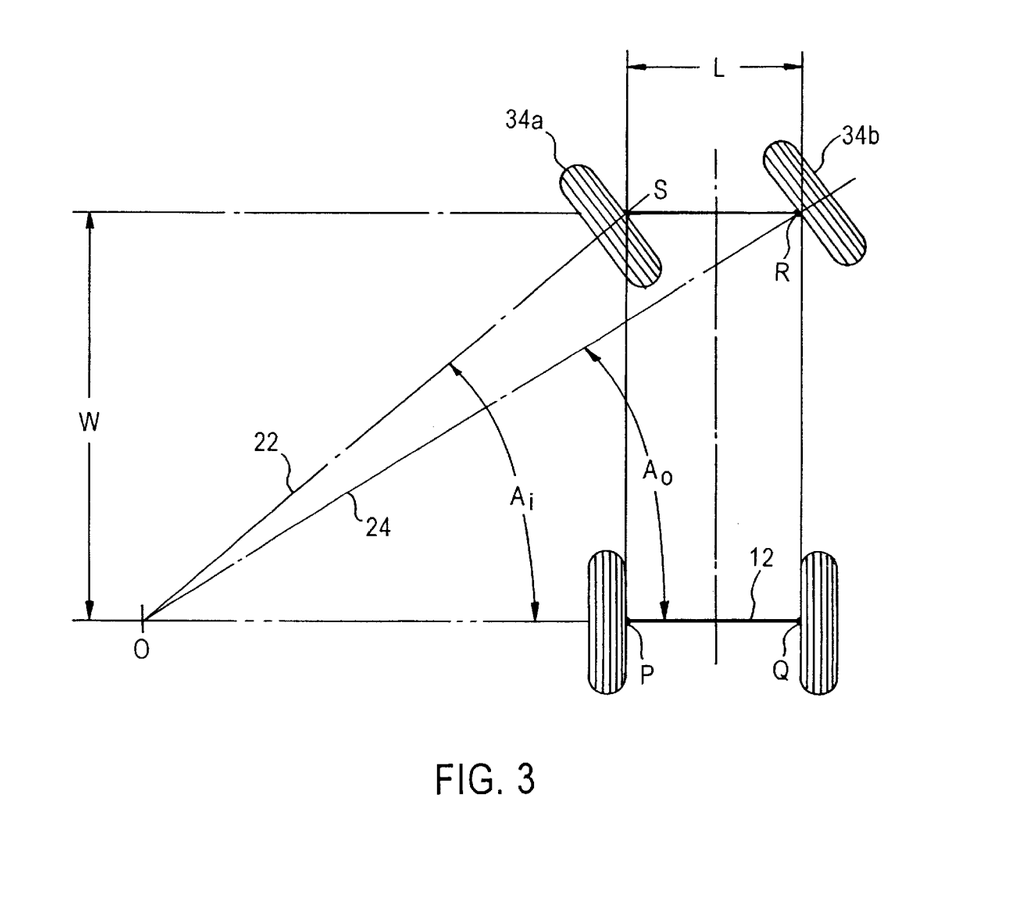
FIG. 3 shows an example for determining a theoretical Ackermann angle based on a vehicle having a steering system with true Ackermann geometry.

FIG. 3 shows a vehicle having a steering system with true Ackermann geometry. The inner wheel 34a has an inner toe angle Ai and the outer wheel 34b has an outer toe angle Ao. Lines 22 and 24 represent the axes of the respective steerable wheels 34a and 34b. The center lines of the rear and front axles intersect at point O. The steering system thus has perfect Ackermann geometry and will have an optimum rolling action relative to point O. The track width is L and the wheelbase is W. The track width and wheelbase may be obtained by accessing a database storing such information for vehicles, input of an operator based on a specification, or measured by technicians using measurement devices well known in the field.

The relationship between toe angles Ai and Ao can be determined from triangle OPS and triangle OQR:

$$L = W(\cot Ao) - W(\cot Ai)$$

$$\cot Ao - \cot Ai = L/W$$

$$\cot Ao = L/W + \cot Ai$$

Thus, $Ao = \cot^{-1}(L/W + \cot Ai)$; or $Ai = \cot^{-1}(\cot Ao - L/W)$ (1)

Hence, when a steerable wheel is positioned at a first toe angle, such as 20 degrees as specified in TOOT specification, the data processing system can calculate the theoretical Ackermann angle corresponding to the first toe angle based on equation (1). Then, an Ackermann percentage can be calculated according to an equation as follows:

Ackermann Percentage=[(measured toe angle)/theoretical Ackermann angle]*100%

The data processing system can then determine Ackermann geometry status of the steering system based on the Ackermann percentage and a predetermined threshold value. For example, if the threshold value is set at ±20%, once the detected toe angle of the steerable wheel is more than 120% or less than 80% of the theoretical Ackermann angle, the data processing system determines the steering system as having Ackermann geometry; otherwise, the steering system is determined as lacking Ackermann geometry.

In another aspect, target percentage of Ackermann geometry and tolerance can be set by an operator. For example, if target Ackermann geometry is specified at 75% and tolerance is set at ±20%, a vehicle with Ackermann geometry between 55% and 95% would pass the test.

The difference between the measured toe angle and the theoretical Ackermann angle can also be expressed as an Ackermann Error. Ackermann Errors are defined according to the following equation:

Ackermann Error=(measured toe angle)−(theoretical Ackermann angle)

The data processing system can then determine Ackermann geometry status of the steering system based on the Ackermann Errors and a predetermined threshold value. For example, if the threshold value is set at±three degrees, once the detected toe angle of the steerable wheel is three degrees more or less than the theoretical Ackermann angle, the data processing system determines the steering system as having improper Ackermann geometry; otherwise, the steering system is determined as having proper Ackermann geometry.

Troubleshooting

According to an implementation of the disclosure, the data processing system also bears programming to display a troubleshooting process in response to a determination as lacking symmetry or Ackermann geometry he troubleshooting process may provide a check list guiding technicians to go through certain diagnosis procedure. For example:

Check distance from steering knuckle to brake rotor, comparing one side to the other.

Check straightness of tie rods and other steering links.

Check vertical distance of steering knuckle from ground, comparing one side to the other. Insure that tire diameters are the same and inflation is the same.

Check for possible incorrect service part, such as mismatch of steering knuckle lengths.

Check that the steering mechanism is centered when the toe is equalized. Check for unequal length tie rods. For a positive diagnosis, run the full Ackermann curve and adjust tie rods until curve is symmetric.

In order to a provide better guidance, animation or video display showing instructions related to the troubleshooting procedures, such as corresponding locations for diagnosis, step-by-step instructions to measurements, and other information that may assist technicians, are also displayed.

Figure 4A:
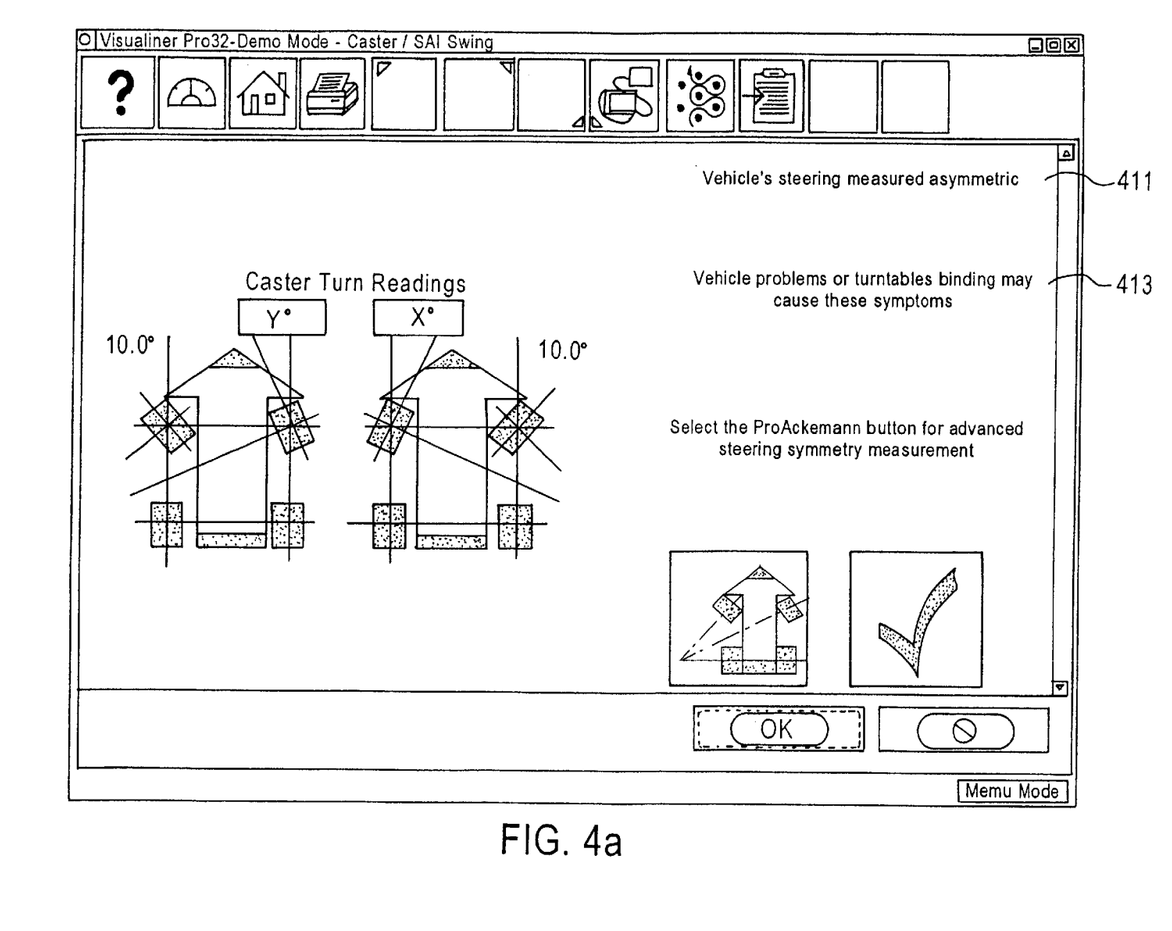
FIGS. 4a–4c illustrate an example of displaying diagnostic guidance when the steering system is determined as asymmetrical.
Figure 4B:
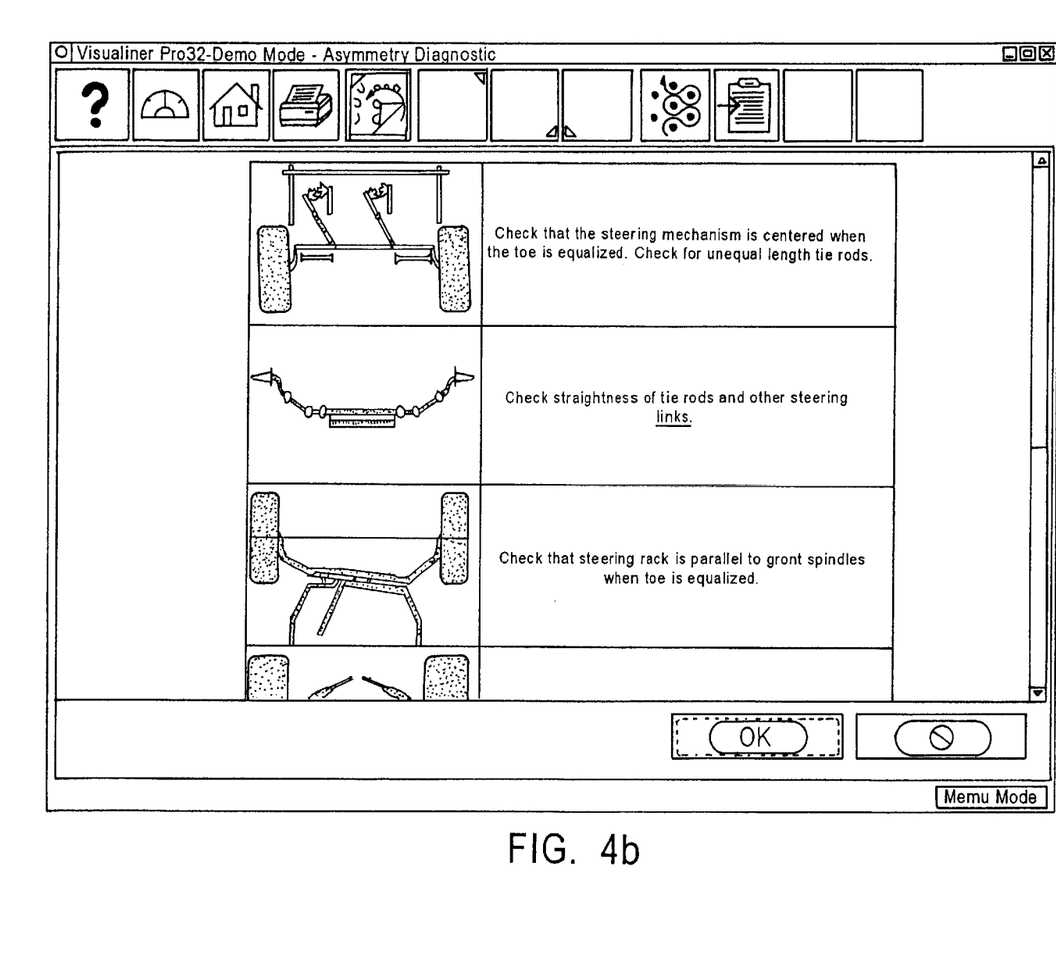
Figure 4C:
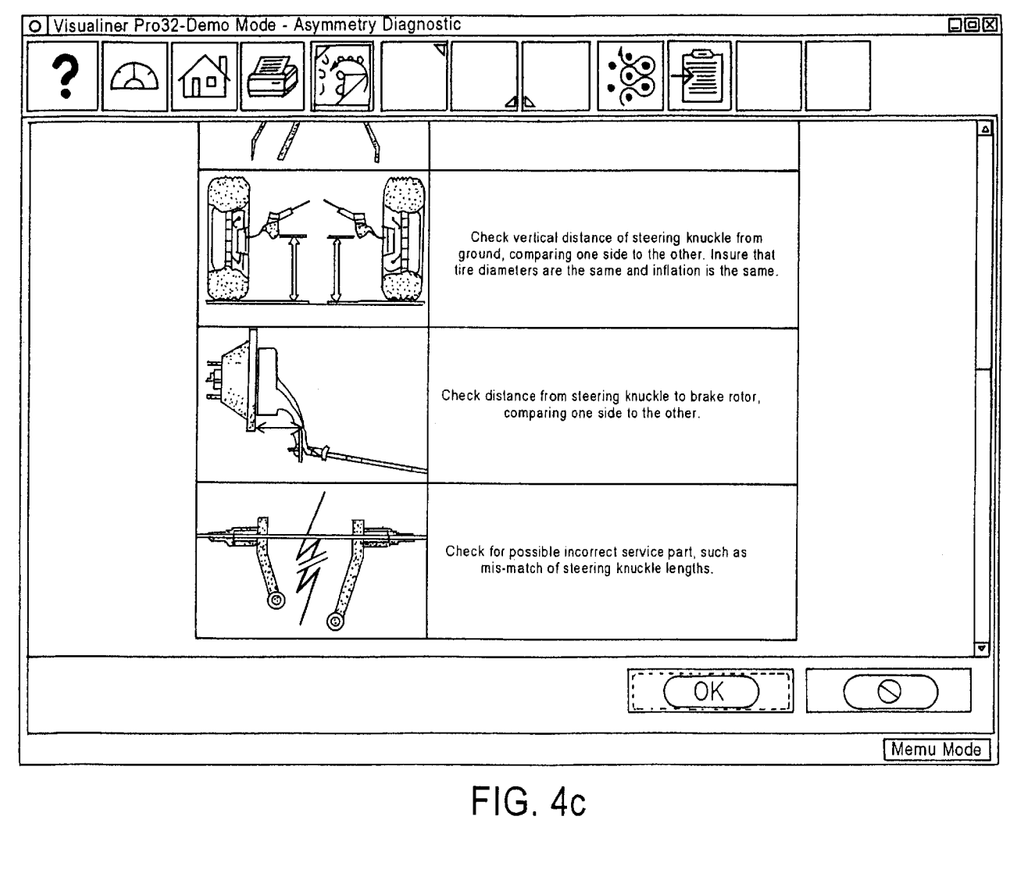

FIGS. 4a–4c show an example of providing diagnostic guidance to technicians when the steering system is determined as lacking symmetry or Ackermann geometry. In FIG. 4a, message 411 indicates that the vehicle is determined as asymmetrical. Message 413 indicates possible problems that may cause the asymmetry. If the technician is familiar with diagnostic procedures, the technician can proceed without seeking the system's assistance. On the other hand, if the technician is not familiar with the diagnostic procedures, the operator may enter a command controlling the system to generate detailed guidance, such as shown in FIGS. 4b and 4c, which displays possible parts that may contribute to the asymmetry and related checking points thereof.

Figure 5:
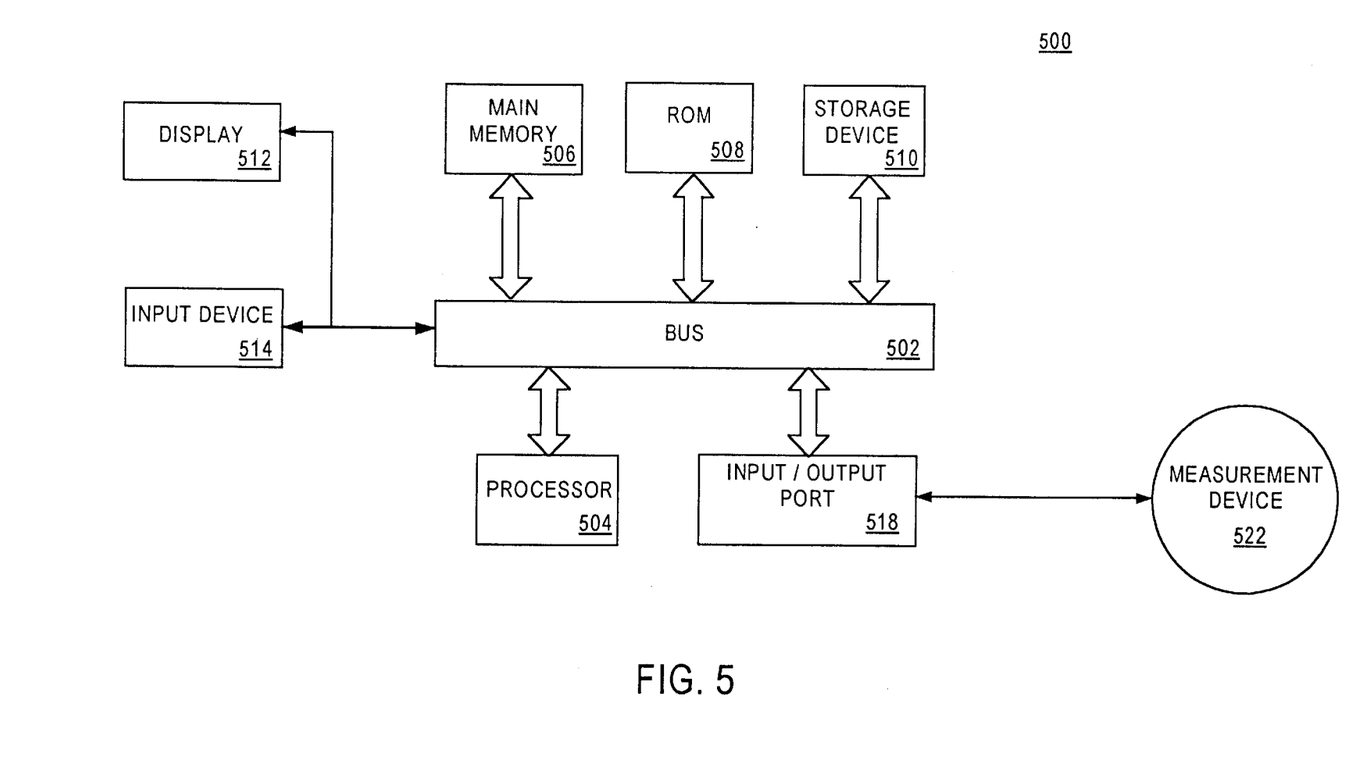
FIG. 5 depicts a data processing system upon which a system according to the present disclosure may be embodied.

FIG. 5 is a block diagram of a data processing system, such as a computer system 500, upon which an embodiment of the disclosure may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructioris to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. The computer system 500 may have an input/output port 518 for connecting to peripheral devices, such as a measurement device 522, for receiving and outputting signals and commands.

A system according to the disclosure displays Ackermann curves, such as toe errors from one hundred percent Ackermann geometry at regularly spaced increments of steering, percentage of a reference curve with one hundred, percent Ackermann geometry at regularly spaced increments of steering, or plot of total toe versus steering angle, or other curves of interest to operators.

Figure 6:
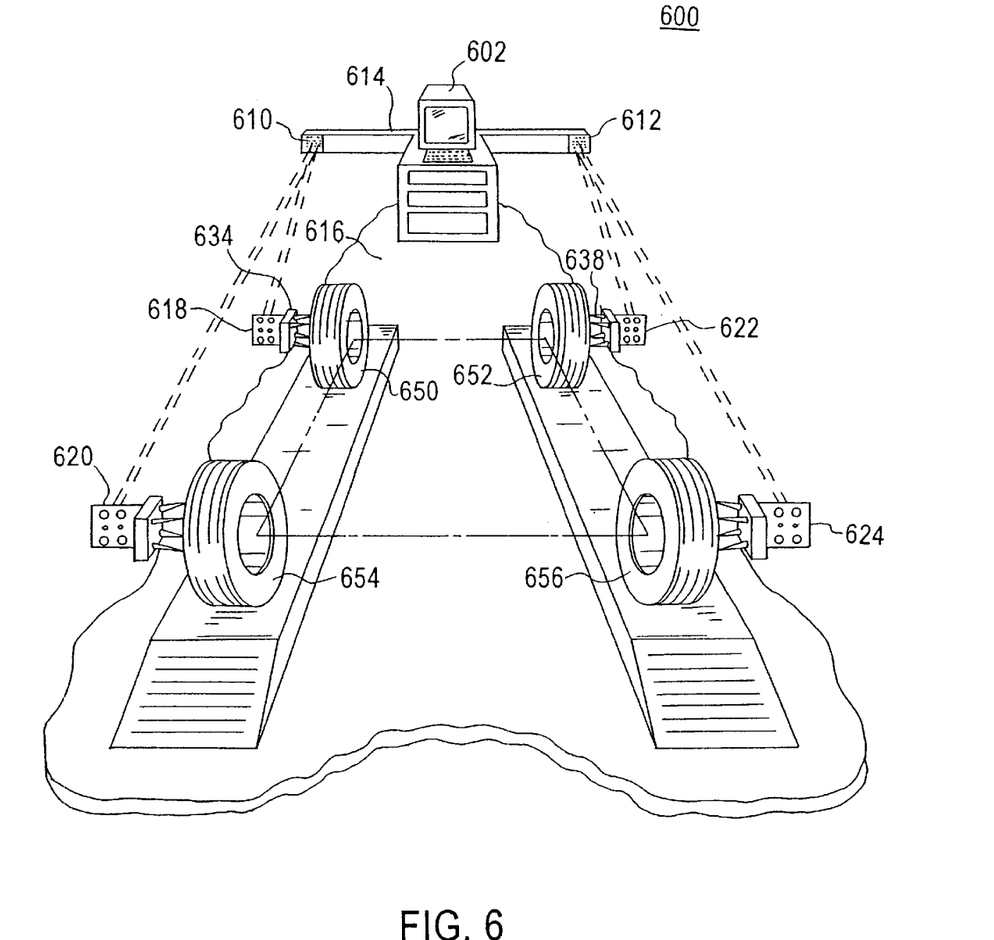
FIG. 6 illustrates an exemplary system according to the present disclosure with the measurement device in determining toe angles and positions of vehicle wheels.

Target devices 618, 622, 620, 624 are mounted on each of the wheels 650, 652, 654, 656, of the motor vehicle, with each target device 618, 620, 622, 624 including a target body 634, and an attachment apparatus 638. The attachment apparatus 638 attaches the target devices to the wheels. An example of an attachment apparatus is described in U.S. Pat. No. 5,024,001, entitled "Wheel Alignment Rim Clamp Claw" issued to Borner et al. on Jun. 18, 1991, incorporated herein by reference.

Target devices 618, 620, 622, 624 may consist of a flat plate with a pattern of two or more differently sized circles marked in a pre-determined format thereon. In practice, a mathematical representation, or data corresponding to a true image (i.e. an image taken by viewing the target device perpendicularly to its primary plane) and the dimensions of the target device are preprogrammed into the memory of a computer so that, during the determination process, the computer has a reference image to which the viewed perspective images of the target devices can be compared.

The computer calculates the orientation of the target devices 618, 620, 622, 624 by identifying certain geometric characteristics on the target device. The computer takes perspective measurements and compares these measurements with the true image previously pre-programmed into the memory of the computer. Method and systems for determining the positions of various target devices can are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference.

Since the target devices are attached to the wheels, once the orientation of the target devices are known, the toe angles of the wheels are also known. Based on the toe angles, the computer system can conduct required calculations as discussed above.

Ackermann Curve

Even though one hundred percent Ackermann geometry is not practical and generally not desired, the relationship of steering characteristics to theoretically pure Ackermann is an useful tool for steering system analysis, such as vehicle development, racing car development and tuning, collision repair analysis, and heavy truck fleets. For each different steering angles, theoretical Ackermann angles can be calculated according to equation (1), as discussed above. A desired percent of Ackermann can be input by the operator, such as 100% Ackermann, 85% Ackermann, or 115 percent Ackermann, depending on the operator's preference.

FIG. 6 shows an exemplary system including a computer 602 and a measurement device based on the present disclosure. The system 600 includes a measurement device having a pair of fixed, spaced-apart cameras 610, 612 mounted on a beam 614, and target devices 618, 620, 622, and 624 for mounting on vehicle wheels 650, 652, 654, 656. The beam 614 has a length sufficient to position the cameras 610, 612 respectively outboard of the sides of the vehicle to be imaged by the determination system 600. Also, the beam 614 positions the cameras 610, 612 high enough above the shop floor 616 to ensure that target devices 618 on wheel 650 and target device 620 on wheel 654 are within the field of view of the left side camera 610, and target device 622 on wheel 652 and target 624 on wheel 656 are within the field of view of the right side camera 612. Other arrangements of cameras can be used, such as using one camera for each wheel.

Figure 7A:
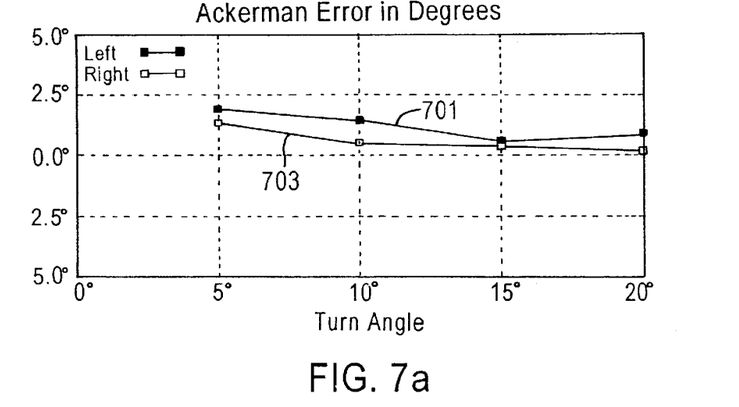
FIG. 7a depicts an exemplary Ackermann curve showing Ackermann Error in Degrees relative to different steering angles.
Figure 7B:
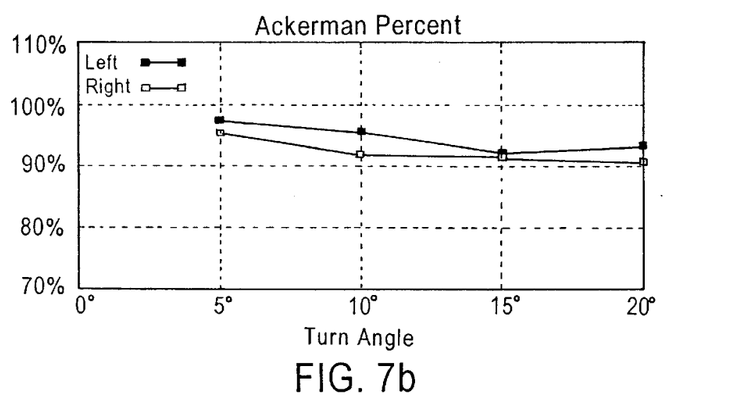
FIG. 7b shows an exemplary Ackermann curve illustrating Ackermann Percent relative to different steering angles.
Figure 7C:
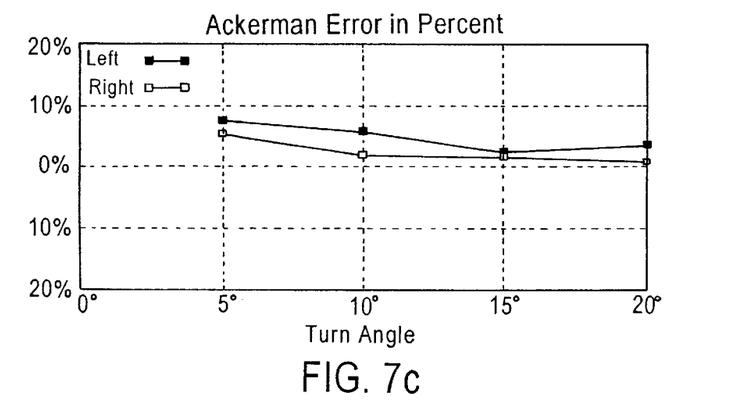
FIG. 7c illustrates an exemplary Ackermann curve showing Ackermann Error in Percent relative to turn angles.

FIG. 7a shows Ackermann Error in Degrees (the difference between measured toe angles and theoretical Ackermann angles) relative to steering angles. Curve 701 is the left wheel and curve 703 is the right wheel. FIG. 7b shows Ackermann Percent curves relative to different steering angles. Ackermann percent is defined as dividing the theoretical Ackermann angle into the measured toe angle and multiplying by 100%. Curve 705 is the left wheel and curve 707 is the right wheel. FIG. 7c illustrates Ackermann Error in Percent curve relative to turn angles. Ackermann Error in Percent is defined as the difference between desired Ackermann percent and the Ackermann percent illustrated in FIG. 7b.

One aspect of the disclosure displays Ackermann curves relative to different steering angle increments, depending the operator's preference. According to a system of the present disclosure, the system allows operators to input choice of steering angle increments: 2 degrees, 4 degrees, and 5 degrees. Other increments may be implemented depending on design requirements. These curves assist operators in evaluating the steering system of a vehicle.

From the above descriptions of the present disclosure, it is clear that the present disclosure provides an advantage that symmetry of a steering system can be determined at any toe angle without requiring the steerable wheel be positioned at exactly 20 degrees, as required by the TOOT specification. The present disclosure also allows determination of symmetry based on the angle difference between the toe angles of the wheels without the need of a TOOT specification.

In addition, the disclosure provides an improved alignment procedure that includes determination of symmetry of the steering system into alignment procedures. The disclosure also provides a novel procedure to determine Ackermann geometry status of a steering system based on theoretical Ackermann angles. Another advantage achieved by the present disclosure is providing technicians with troubleshooting guidance once asymmetry is detected in the steering system. Other and additional advantages of the present disclosure will be appreciated by people skilled in the art from the descriptions above or from practicing or using the present disclosure.

While certain descriptions in the above illustrate the disclosure based on turning the inner wheels and measuring the toe angles of the outer wheels, it is understood that the method and system can be carried out inversely by turning the outer wheels and measuring the toe angles of the inner wheels to determine symmetry of the steering system.

Those skilled in the art will recognize, or be able to ascertain using no more than routine experimentation, many equivalents to the specific embodiments of the disclosure specifically described herein. Such equivalents are intended to be encompassed in the scope of the following claims.

What is claimed is:

1. A method for determining symmetry of the steering system of a vehicle of a type having first and second steerable wheels normal to a common axis when the wheels are aligned to a longitudinal axis of the vehicle, the method comprising the steps of:
   a) detecting a first measured toe angle of the first steerable wheel when the second steerable wheel is positioned in a first direction at a reference toe angle;
   b) detecting a second measured toe angle of the second steerable wheel when the first steerable wheel is positioned in a second direction at the reference toe angle, wherein the second direction is opposite to the first direction relative to the longitudinal axis of the vehicle; and
   c) determining symmetry of the steering system based on the first measured toe angle and the second measured toe angle.

2. The method of claim 1, wherein the first steerable wheel is the right steerable wheel and the second steerable wheel is the left steerable wheel of the vehicle.

3. The method of claim 1, wherein the first steerable wheel is the left steerable wheel and the second steerable wheel is the right steerable wheel of the vehicle.

4. The method of claim 1, wherein the step of determining symmetry of the steering system determines symmetry of the steering system based on the first measured toe angle, the second measured toe angle, and a threshold value.

5. The method of claim 4, wherein the determining step further comprises the steps of:

c1) calculating an angle difference between the first measured toe angle and the second measured toe angle;

c2) comparing the angle difference with the threshold value; and c3) determining symmetry of the steering system based on a result of step (c2).

6. The method of claim 4, wherein the threshold value is determined based on the value of the reference toe angle.

7. A system for determining symmetry of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

a processor for processing data;

a memory;

a data storage device for storing data;

an input device for inputting data; and a bus coupling to the input device, the memory, the data storage device, and the processor;

the data storage device bearing instructions to cause the system upon execution of the instructions by the processor to perform the machine-implemented steps of:

a) receiving a first signal representative of a first measured toe angle of the first steerable wheel when the second steerable wheel is positioned in a first direction at a reference toe angle;

b) receiving a second signal representative of a second measured toe angle of the second steerable wheel when the first steerable wheel is positioned in a second direction at the reference toe angle, wherein the second direction is opposite to the first direction relative to the longitudinal axis of the vehicle; and c) determining symmetry of the steering system based on the first measured toe angle and the second measured toe angle.

8. The system of claim 7, further comprising a display, and the data storage device further bearing instructions to cause the system upon execution of the instructions by the processor to display a troubleshooting process in response to the steering system being determined as asymmetrical.

9. The system of claim 7, wherein steps (a) and (b) are conducted during a caster swing procedure.

10. The system of claim 7, wherein steps (a) and (b) are conducted during a Toe Out On Turns procedure.

11. The system of claim 7, wherein steps (a) and (b) are conducted during an SAI measurement process.

12. The system of claim 7, wherein the reference toe angle is substantially equal to 10 degrees.

13. The system of claim 7, wherein the reference toe angle is a predetermined angle.

14. The system of claim 7, wherein the first steerable wheel is the right steerable wheel and the second steerable wheel is the left steerable wheel of the vehicle.

15. The system of claim 7, wherein the first steerable wheel is the left steerable wheel and the second steerable wheel is the right steerable wheel of the vehicle.

16. The system of claim 7, wherein the determining step determines symmetry of the steering system based on the first measured toe angle, the second measured toe angle, and a threshold value.

17. The system of claim 16, wherein the threshold value is determined based on the value of the reference toe angle.

18. A system for determining symmetry of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

a processor for processing data;

a memory;

a data storage device for storing data;

an input device for inputting data; and a bus coupling to the input device, the memory, the data storage device, and the processor;

the data storage device bearing instructions to cause the system upon execution of the instructions by the processor to perform the machine-implemented steps of:

a) receiving a first signal representative of a first measured toe angle of the first steerable wheel when the second steerable wheel is positioned in a first direction at a first toe angle;

b) receiving a second signal representative of a second measured toe angle of the second steerable wheel when the first steerable wheel is positioned in a second direction at a second toe angle, wherein the second direction is opposite to the first direction relative to the longitudinal axis of the vehicle;

c) generating a normalized first measured toe angle based on the difference between the first toe angle and a predetermined angle stored in the data storage device;

d) generating a normalized second toe angle based on the difference between the second toe angle and the predetermined angle; and e) determining symmetry of the steering system based on the normalized first measured toe angle and the normalized second measured toe angle.

19. The system of claim 18, further comprising a display, and the data storage device further bearing instructions to cause the system upon execution of the instructions by the processor to display a troubleshooting process in response to the steering system being determined as asymmetrical.

20. The system of claim 18, wherein the first steerable wheel is the right steerable wheel and the second steerable wheel is the left steerable wheel of the vehicle.

21. The method of claim 18, wherein the first steerable wheel is the left steerable wheel and the second steerable wheel is the right steerable wheel of the vehicle.

22. The system of claim 18, wherein the threshold value is determined based on the value of the predetermined angle.

23. The system of claim 18, wherein the determining step determines symmetry of the steering system based on the normalized first measured toe angle, the normalized second measured toe angle, and a threshold value.

24. The system of claim 23, wherein step (d) further comprises the steps of:

(c1) calculating an angle difference between the normalized first measured toe angle and the normalized second measured toe angle;

(c2) comparing the angle difference with the threshold value; and (c3) determining symmetry of the steering system based on a result of step (c2).

25. A system for determining Ackermann geometry status of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

a processor for processing data;

a memory;

a data storage device for storing data;

an input device for inputting data; and a bus coupling to the input device, the memory, the data storage device, and the processor;

the data storage device bearing instructions to cause the system upon execution of the instructions by the processor to perform the machine-implemented steps of:

a) receiving a first signal representative of a first toe angle of the first steerable wheel;

b) receiving a second signal representative of a second toe angle of the second steerable wheel when the first steerable wheel is positioned at the first toe angle;

c) calculating a theoretical Ackermann angle based on a wheelbase value representing the length of the vehicle's wheelbase, a track width value representing the length of the vehicle's track width, and the first toe angle; and    d) determining Ackermann geometry status of the steering system based on the second toe angle and the theoretical Ackermann angle.

26. The system of claim 25, further comprising a display, and the data storage device further bearing instructions to cause the system upon execution of the instructions by the processor to display a troubleshooting process in response to the steering system being determined as lacking proper Ackermann geometry.

27. The system of claim 25, wherein step (d) comprises the steps of:

(d1) determining an Ackermann percentage based on the second toe angle and the theoretical Ackermann angle;

(d2) comparing the Ackermann percentage with a threshold value; and    (d3) determining Ackermann geometry status of the steering system based on a result of step (d2).

28. The system of claim 25, wherein the first steerable wheel is the right steerable wheel and the second steerable wheel is the left steerable wheel.

29. The system of claim 25, wherein the first steerable wheel is the left steerable wheel and the second steerable wheel is the right steerable wheel.

30. The system of claim 25, wherein the first toe angle is a reference angle specified in a Toe Out On Turns specification.

31. The system of claim 25, wherein the first toe angle is 20 degrees toe-out.

32. A system for plotting an Ackermann curve for the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

a processor for processing data;

a memory;

a data storage device for storing data;

an input device for inputting data; and a bus coupling to the input device, the memory, the data storage device, and the processor;

the data storage device bearing instructions to cause the system upon execution of the instructions by the processor to perform the machine-implemented steps of:

a) receiving first signals representative of first toe angles of the first steerable wheel when the steerable wheels are being turned to a first direction;

b) receiving second signals representative of second toe angles of the second steerable wheel when the steerable wheels are turned to the first direction;

c) calculating theoretical Ackermann angles based on a wheelbase value representing the length of the vehicle's wheelbase, a track width value representing the length of the vehicle's track width, and the first toe angles; and    e) displaying an Ackermann curve of the steering system based on the second toe angles and the theoretical Ackermann angles.

33. The system of claim 32, wherein step (a) further includes a step of receiving first signals representative of first toe angles of the first steerable wheel when the steerable wheels are being turned to a second direction; and step (b) further includes a step of receiving second signals representative of second toe angles of the second steerable wheel when the steerable wheels are turned to the second direction; and step (e) includes a step of displaying the Ackermann curve for the first direction along side with the Ackermann curve for the second direction.

34. A method for determining Ackermann geometry status of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the method comprising the machine-implemented steps of:

a) receiving a first signal representative of a first toe angle of the first steerable wheel;

b) receiving a second signal representative of a second toe angle of the second steerable wheel when the first steerable wheel is positioned at the first toe angle;

c) calculating a theoretical Ackermann angle based on a wheelbase value representing the length of the vehicle's wheelbase, a track width value representing the length of the vehicle's track width, and the first toe angle; and    d) determining Ackermann geometry status of the steering system based on the second toe angle and the theoretical Ackermann angle.

35. The method of claim 34, further comprising a step of displaying a troubleshooting process in response to the steering system being determined as lacking proper Ackermann geometry.

36. The method of claim 34, wherein the first toe angle is a reference angle specified in a Toe Out On Turns specification.

37. The method of claim 34, wherein the first toe angle is 20 degrees toe-out.

38. A system for determining symmetry of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

processor means for processing data;

memory means;

data storage means for storing data;

input means for inputting data; and bus means coupling to the input means, the memory means, the data storage means, and the processor means;

the data storage means bearing instructions to cause the system upon execution of the instructions by the processor means to perform the machine-implemented steps of:

a) receiving a first signal representative of a first measured toe angle of the first steerable wheel when the second steerable wheel is positioned in a first direction at a reference toe angle;
   b) receiving a second signal representative of a second measured toe angle of the second steerable wheel when the first steerable wheel is positioned in a second direction at the reference toe angle, wherein the second direction is opposite to the first direction relative to the longitudinal axis of the vehicle; and
   c) determining symmetry of the steering system based on the first measured toe angle and the second measured toe angle.

39. A system for determining symmetry of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

processor means for processing data;
   memory means;
   data storage means for storing data;
   input means for inputting data; and
   bus means coupling to the input means, the memory means, the data storage means, and the processor means;
   the data storage means bearing instructions to cause the system upon execution of the instructions by the processor means to perform the machine-implemented steps of:
   a) receiving a first signal representative of a first measured toe angle of the first steerable wheel when the second steerable wheel is positioned in a first direction at a first toe angle;
   b) receiving a second signal representative of a second measured toe angle of the second steerable wheel when the first steerable wheel is positioned in a second direction at a second toe angle, wherein the second direction is opposite to the first direction relative to the longitudinal axis of the vehicle;
   c) generating a normalized first measured toe angle based on the difference between the first toe angle and a predetermined angle stored in the data storage device;
   d) generating a normalized second toe angle based on the difference between the second toe angle and the predetermined angle; and
   e) determining symmetry of the steering system based on the normalized first measured toe angle and the normalized second measured toe angle.

40. A system for determining symmetry of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

processor means for processing data;
   memory means;
   data storage means for storing data;
   input means for inputting data; and
   bus means coupling to the input means, the memory means, the data storage means, and the processor means;
   the data storage means bearing instructions to cause the system upon execution of the instructions by the processor means to perform the machine-implemented steps of:
   a) receiving a first signal representative of a first toe angle of the first steerable wheel;
   b) receiving a second signal representative of a second toe angle of the second steerable wheel when the first steerable wheel is positioned at the first toe angle;
   c) calculating a theoretical Ackermann angle based on a wheelbase value representing the length of the vehicle's wheelbase, a track width value representing the length of the vehicle's track width, and the first toe angle; and
   d) determining Ackermann geometry status of the steering system based on the second toe angle and the theoretical Ackermann angle.

41. A system for determining symmetry of the steering system of a vehicle of a type having first and second steerable wheels normal to a common axis when the wheels are aligned to a longitudinal axis of the vehicle, wherein the system is configured to connect to a measurement device for generating toe angle signals representative of toe angles of the steerable wheels, the system comprising:

processor means for processing data;
   memory means;
   data storage means for storing data;
   input means for inputting data; and
   bus means coupling to the input means, the memory means, the data storage means, and the processor means;
   the data storage means bearing instructions to cause the system upon execution of the instructions by the processor means to perform the machine-implemented steps of:
   a) receiving first signals representative of first toe angles of the first steerable wheel when the steerable wheels are being turned to a first direction;
   b) receiving second signals representative of second toe angles of the second steerable wheel when the steerable wheels are turned to the first direction;
   c) calculating theoretical Ackermann angles based on a wheelbase value representing the length of the vehicle's wheelbase, a track width value representing the length of the vehicle's track width, and the first toe angles; and
   e) displaying an Ackermann curve of the steering system based on the second toe angles and the theoretical Ackermann angles.

* * * * *